US 6,630,527 B2

(12) United States Patent
Pierre et al.

(10) Patent No.: US 6,630,527 B2
(45) Date of Patent: Oct. 7, 2003

(54) UV STABILIZED, IMPACT MODIFIED POLYESTER/POLYCARBONATE BLENDS, ARTICLES, AND METHODS OF MANUFACTURE THEREOF

(75) Inventors: Jean R. Pierre, Saint-Denis (BE); Peter H. Th. Vollenberg, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,802

(22) Filed: Oct. 19, 2001

(65) Prior Publication Data

US 2003/0109629 A1 Jun. 12, 2003

(51) Int. Cl.[7] .......................... C08L 67/02; C08L 69/00
(52) U.S. Cl. .................. 524/102; 524/99; 524/100; 524/106; 524/439; 525/67; 525/133; 525/439
(58) Field of Search .................. 524/102, 99, 100; 525/67, 133, 439

(56) References Cited

U.S. PATENT DOCUMENTS

| | | | | |
|---|---|---|---|---|
| 2,465,319 A | 3/1949 | Whinfield et al. | ............ | 260/75 |
| 2,675,390 A | 4/1954 | Rosenblatt | .................. | 260/313 |
| 2,888,484 A | 5/1959 | Dehm | ........................ | 260/514 |
| 3,047,539 A | 7/1962 | Pengilly | ........................ | 260/75 |
| 3,078,254 A | 2/1963 | Zelinski et al. | ............ | 260/45.5 |
| 3,118,887 A | 1/1964 | Hardy et al. | ................. | 260/248 |
| 3,244,708 A | 4/1966 | Duennenberger | ........... | 260/248 |
| 3,265,765 A | 8/1966 | Holden et al. | ............... | 260/876 |
| 3,297,793 A | 1/1967 | Dollinger | .................... | 260/879 |
| 3,402,159 A | 9/1968 | Hsieh | ........................ | 260/85.1 |
| 3,423,360 A | 1/1969 | Huber et al. | .................. | 260/47 |
| 3,442,898 A | 5/1969 | Luethi | ........................ | 260/251 |
| 3,444,237 A | 5/1969 | Jaffe | ........................ | 260/468 |
| 3,594,452 A | 7/1971 | De La Mare et al. | ...... | 260/880 |
| 3,635,895 A | 1/1972 | Kramer | ................. | 260/47 XA |
| 3,953,404 A | 4/1976 | Borman | .................. | 260/75 M |
| 4,001,184 A | 1/1977 | Scott | ..................... | 260/47 XA |
| 4,022,748 A | 5/1977 | Schlichting et al. | ...... | 260/40 R |
| 4,034,013 A | 7/1977 | Lane | ........................... | 260/835 |
| 4,090,966 A | 5/1978 | Clendenen | .................. | 210/143 |
| 4,092,202 A | 5/1978 | Bergk et al. | ................. | 156/331 |
| 4,210,612 A | 7/1980 | Karrer | ........................ | 525/204 |
| 4,217,438 A * | 8/1980 | Brunelle et al. | ............ | 528/202 |
| 4,257,937 A * | 3/1981 | Cohen et al. | ............. | 260/40 R |
| 4,271,064 A * | 6/1981 | Dieck | ....................... | 260/40 R |
| 4,292,233 A * | 9/1981 | Binsack et al. | .......... | 260/40 R |
| 4,636,544 A * | 1/1987 | Hepp | ......................... | 524/411 |
| 4,754,064 A * | 6/1988 | Lillwitz | ..................... | 562/509 |
| 4,786,692 A * | 11/1988 | Allen | ........................ | 525/439 |
| 4,831,068 A * | 5/1989 | Reinert et al. | ............. | 524/100 |
| 4,895,901 A * | 1/1990 | Ramey et al. | .............. | 525/127 |
| 4,895,981 A * | 1/1990 | Reinert et al. | ................. | 8/565 |
| 5,015,682 A * | 5/1991 | Galbo | ....................... | 524/102 |
| 5,298,067 A * | 3/1994 | Valet et al. | .................. | 106/506 |
| 5,411,999 A | 5/1995 | Gallucci | ..................... | 523/436 |
| 5,441,997 A | 8/1995 | Walsh et al. | ................. | 524/147 |
| 5,597,854 A | 1/1997 | Birbaum et al. | ............ | 524/100 |
| 5,817,821 A | 10/1998 | Valet et al. | | |
| 5,981,661 A | 11/1999 | Liao et al. | .................. | 525/165 |
| 6,051,164 A | 4/2000 | Samuels | | |
| 6,239,276 B1 | 5/2001 | Gupta et al. | ................ | 544/213 |
| 6,255,483 B1 | 7/2001 | Fletcher et al. | | |
| 6,291,574 B1 | 9/2001 | Gallucci | | |
| 6,458,913 B1 * | 10/2002 | Honigfort | ................... | 528/196 |

FOREIGN PATENT DOCUMENTS

| | | |
|---|---|---|
| EP | 0 434 608 A1 | 11/1990 |
| EP | 0 458 741 A2 | 4/1991 |
| EP | 0 483 488 A1 | 9/1991 |
| GB | 1264741 | 3/1970 |
| WO | 86/03528 | 6/1986 |

* cited by examiner

Primary Examiner—Patricia A Short

(57) ABSTRACT

Disclosed herein is a UV stabilized composition, comprising a polyester resin and a polycarbonate resin; an impact modifier; and an additive composition comprising a hindered amine light stabilizer and another UV absorber. Such compositions find utility in the manufacture of automobile components, for example.

6 Claims, No Drawings

UV STABILIZED, IMPACT MODIFIED POLYESTER/POLYCARBONATE BLENDS, ARTICLES, AND METHODS OF MANUFACTURE THEREOF

BACKGROUND OF THE INVENTION

This disclosure relates to polymer blends, and in particular to improved polyester/polycarbonate blends.

There is substantial commercial interest in the use of transparent polyester/polycarbonate blends, especially those containing impact modifiers. Blends of polyester and polycarbonate having impact modifiers are known in the art. U.S. Pat. No. 5,981,661 to Liao et al. is directed to an impact modifier in a polyester and polycarbonate blend, along with a flame retardant and a single benzotriazole UV stabilizer. U.S. Pat. No. 5,411,999 to Gallucci is directed to a polyester-polycarbonate composition, comprising a polyester having epoxy functionality, polycarbonate, a high impact rubbery modifier, and a catalyst quencher. U.S. Pat. No. 6,291,574 to Gallucci is directed to a moldable thermoplastic polyester composition comprising a sound damping amount of a monoalkenyl arene isoprenoid rubber modifier having a high level of 1,2 or 3,4 linkages.

Various rubbery modifiers have been added to polyesters to improve impact, including: U.S. Pat. No. 4,022,748 directed to rubber elastic graft copolymers; U.S. Pat. Nos. 4,034,013 and 4,092,202 directed to multistage polymers having a rubbery interior and a hard outer shell derived from acrylates; U.S. Pat. Nos. 4,090,966 and 4,271,064 directed to selectively hydrogenated monoalkenyl arene-diene block copolymers as polyester modifiers; and U.S. Pat. No. 4,257,937 directed to polyester-polycarbonate blends with polyacrylate resins.

However, it has been found that certain impact modified polyester/polycarbonate blends are prone to discoloration upon exposure to ultraviolet (UV) light. Such discoloration can be particularly acute when acrylonitrile-butadiene-styrene (ABS) impact modifiers are used. Accordingly, there remains a need in the art for impact modified polyester/polycarbonate compositions that are stabilized to the effects of UV light, such that the compositions do not discolor upon exposure to UV light.

SUMMARY OF INVENTION

A polyester/polycarbonate composition having enhanced stability to UV light exposure comprises a polymer system comprising a blend of a polyester resin and a polycarbonate resin; an impact modifier; and an additive composition comprising a hindered amine light stabilizer and a UV absorber.

In another embodiment, an essentially transparent, UV stabilized composition comprises a polymer system, wherein the polymer system comprises a cycloaliphatic polyester resin and a linear polycarbonate resin; a rubber grafted ABS impact modifier, wherein the ABS impact modifier comprises greater than or equal to about 90 wt % styrene-acrylonitrile copolymer grafted onto polybutadiene; and an additive composition comprising a hindered amine light stabilizer represented by the formula:

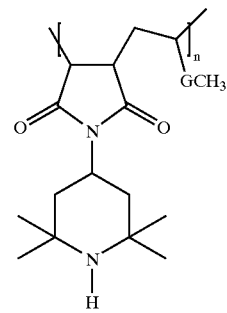

wherein G is an alkyl group having from 17 to 21 carbon atoms, and n is on average greater than about 4, and less than about 7; and a UV absorber selected from the group consisting of a different hindered amine light stabilizer, a hydroxyphenyl-triazene, a hydroxyphenyl-pyrimidine, a benzotriazole, or a combination comprising at least one of the foregoing UV absorbers.

DETAILED DESCRIPTION

It has been unexpectedly found that a UV stabilized polyester/polycarbonate composition containing ABS-type impact modifiers may be achieved by using an additive composition comprising a blend of two or more different UV absorbers, wherein at least one of the UV absorbers is a hindered amine light stabilizer.

Blends of polyesters (PE) and polycarbonates (PC) are the preferred polymer system, especially when transparent or essentially transparent compositions are preferred. Other polymeric components may be present in the polymer system in relatively minor amounts (e.g., less than about 20 weight percent of the combined PE, PC, and additional polymeric component), such other polymeric components including, for example, thermosetting resins such as alkyds, diallyl phthalates, epoxies, melamines, phenolics, polyesters, urethanes, silicones and the like; elastomers such as acrylates, butyls, polyurethanes, polysulfides, neoprenes, nitrites, silicones, styrenes, butadienes and the like; and thermoplastics such as, acetates, acrylics, cellulosics, polyethers, fluorocarbons, polyamides, polycarbonates, polyethylenes, polypropylenes, polyimides, polyphenyleneoxides, polystyrenes, polysulfones, vinyls, and the like.

Suitable polyesters include those derived from aliphatic, cycloaliphatic, or aromatic diols, or mixtures thereof, containing from 2 to about 10 carbon atoms, and at least one cycloaliphatic or aromatic dicarboxylic acid, and may have repeating units of the following general formula (1):

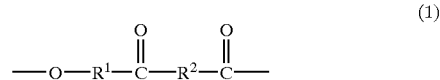

(1)

wherein $R^1$ is a $C_2$–$C_{10}$ aliphatic, cycloaliphatic, or aromatic radical derived from a diol, and $R^2$ is a C—C aryl or cycloaliphatic radical.

The diol may be a glycol, such as ethylene glycol, propylene glycol, trimethylene glycol, 2-methyl-1,3-propane glycol, hexamethylene glycol, decamethylene glycol, cyclohexane dimethanol, or neopentylene glycol; or a diol such as 1,4-butanediol, hydroquinone, and/or resorcinol.

Examples of aromatic dicarboxylic acids represented by the decarboxylated residue $R_2$ are isophthalic or terephthalic acid, 1,2-di(p-carboxyphenyl)ethane, 4,4'-dicarboxydiphenyl ether, 4,4' bisbenzoic acid, and mixtures thereof. All of these acids contain at least one aromatic nucleus. Acids containing fused rings can also be present, such as, for example, in 1,4- 1,5- or 2,6-naphthalene dicarboxylic acids. Preferred dicarboxylic acids include terephthalic acid, isophthalic acid, naphthalene dicarboxylic acid and mixtures comprising at least one of the foregoing.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly (ethylene glycol). Such polyesters can be made following the teachings of, for example, U.S. Pat. Nos. 2,465,319 and 3,047,539.

Other polyesters suitable for use herein include poly (ethylene terephthalate) ("PET"), poly(1,4-butylene terephthalate), ("PBT"), and poly(propylene terephthalate) ("PPT"). For example, PBT resin is obtained by polymerizing a glycol component at least 70 mole %, preferably at least 80 mole %, of which consists of tetramethylene glycol and an acid component at least 70 mole %, preferably at least 80 mole %, of which consists of terephthalic acid, and polyester-forming derivatives therefore. The glycol component may preferably contain not more than about 30 mole %, preferably not more than about 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The acid component may preferably contain not more than about 30 mole %, preferably not more than about 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxy benzoic acid, sebacic acid, adipic acid and polyester-forming derivatives thereof.

Block copolyester resin components are also useful, and can be prepared by the transesterification of straight or branched chain poly(1,4-butylene terephthalate) and a copolyester of a linear aliphatic dicarboxylic acid and, optionally, an aromatic dibasic acid such as terephthalic or isophthalic acid with one or more straight or branched chain dihydric aliphatic glycols. For example a poly(1,4-butylene terephthalate) can be mixed with a polyester of adipic acid with ethylene glycol, and the mixture heated at 235° C. to melt the ingredients, then heated further under a vacuum until the formation of the block copolyester is complete. As the second component, there can be substituted poly (neopentyl adipate), poly(1,6-hexylene azelate-coisophthalate), poly(1,6-hexylene adipate-co-isophthalate) and the like. An exemplary block copolyester of this type is available commercially under the trade designation VALOX 330 (G.E. Plastics, Pittsfield, Mass.).

Useful herein when high melt strength is important, are branched high melt viscosity poly(1,4-butylene terephthalate) ester resins, which include a small amount of (e.g., up to 5 mole percent based on the terephthalate units) a branching component containing at least three ester forming groups. The branching component can provide branching in the acid unit portion of the polyester, or in the glycol unit portion, or it can be hybrid. Such branching components include, for example, tri- or tetracarboxylic acids (i.e., trimesic acid, pyromellitic acid, and lower alkyl esters thereof, and the like); polyols, preferably, triols and tetrols, (i.e., trimethylolpropane, pentaerythritol, and the like); and/or dihydroxy carboxylic acids and hydroxydicarboxylic acids and derivatives (i.e., dimethyl hydroxyterephthalate, and the like.) Branched poly(1,4-butylene terephthalate) resins and their preparation are described in Borman, U.S. Pat. No. 3,953,404. In addition to terephthalic acid units, small amounts, (e.g., from about 0.5 to about 15 weight percent) of other components may be present. Other components include: aromatic dicarboxylic acids (e.g., isophthalic acid, naphthalene dicarboxylic acid, and the like); aliphatic dicarboxylic acids (e.g., adipic acid, oxalic acid and the like) can also be present. In addition, other components include diol components other than those derived from 1,4-butanediol (i.e., ethylene glycol, cyclohexylenedimethanol, and the like), as well as trifunctional, or higher, branching components, (e.g., pentaerythritol, trimethyl trimesate, and the like). In addition, the poly(1,4-butylene terephthalate) resin component can also include other high molecular weight resins such as poly(ethylene terephthalate), block copolyesters of poly(1,4-butylene terephthalate) and aliphatic/aromatic polyesters, and the like.

The molecular weight of the poly(1,4-butylene terephthalate) should be high enough to provide an intrinsic viscosity of at least 0.6, with an intrinsic viscosity of about 0.8 desired, and an intrinsic viscosity of 0.9 deciliters per gram being more desired. The molecular weight should also be low enough to provide an intrinsic viscosity of less than about 2.0, an intrinsic viscosity of about 1.8 desired, and an intrinsic viscosity of 1.6 deciliters per gram being more desired, all of which being measured, for example, as a solution in a 60:40 mixture of phenol and tetrachloroethane at 30° C.

Cycloaliphatic polyesters are the most preferred polyesters, and can be defined in many ways, including the method in which they are prepared. For example, suitable cycloaliphatic polyesters may be prepared by reaction of a diol with a dibasic acid or derivative thereof, provided that at least a portion of the diol and/or the acid is cycloaliphatic. Diols useful in the preparation of suitable polyester resins are straight chain, branched, or cycloaliphatic, with the straight chain or branched alkane diols preferably containing at least 2 carbon atoms, and at most 12 carbon atoms on average. Examples of suitable diols include, but are not limited to, ethylene glycol, propylene glycol (i.e., 1,2- and 1,3-propylene glycol), butane diol, e.g., 1,3- and 1,4-butane diol, diethylene glycol, 2,2-dimethyl-1,3-propane diol, 2-ethyl-2-methyl-1,3-propane diol, 1,3- and 1,5-pentane diol, di-propylene glycol, 2-methyl-15-pentane diol, 1,6-hexane diol, 1,4-cyclohexane dimethanol, triethylene glycol, 1,10-decane diol, mixtures of at least one of the foregoing, and the like. Also, chemical equivalents of diols include esters, such as dialkylesters, diaryl esters, and the like.

Examples of preferred diols include dimethanol-bicyclo-octane, and dimethanol decaline. Most preferred diols are in general cycloaliphatic diols or chemical equivalents thereof, in particular 1,4-cyclohexane dimethanol or a chemical equivalent thereof. In the instance when the preferred cycloaliphatic diol can contain a mixture of cis- and trans-isomers, a cis to trans weight to weight ratio (cis/trans) of at least about 1 to 4 cis/trans, and at most about 4 to 1 cis/trans is preferred, a cis/trans ratio of about 1 to 3 cis/trans being most preferred.

Di-acids (dibasic acids) useful in the preparation of suitable cycloaliphatic polyester resins have at least two carboxyl groups, each of which is attached to a saturated carbon in a saturated ring. A preferred diacid is 1,4- cyclohexanedicarboxylic acid and most preferred is trans-1,4-cyclohexanedicarboxylic acid as further explained above. Other examples of suitable cycloaliphatic acids include decahydro-naphthalene dicarboxylic acid, norbornene dicarboxylic acids, and bicyclo-octane dicarboxylic acids and salts thereof. Linear aliphatic diacids are useful herein provided the polyester has at least one monomer containing a cycloaliphatic ring. Examples of linear aliphatic diacids include, but are not limited to, succinic acid, adipic acid, dimethyl succinic acid, azelaic acid, and the like. Various mixtures of diacid and diols are also suitable for use herein to produce suitable cycloaliphatic polyesters.

Cyclohexanedicarboxylic acids and chemical equivalents thereof can be prepared, for example, by the hydrogenation of cycloaromatic diacids and corresponding derivatives such as isophthalic acid, terephthalic acid of naphthalenic acid in a suitable solvent. This process may also include preparation with water and/or acetic acid at room temperature and atmospheric pressure using suitable catalysts such as rhodium supported on a suitable carrier of carbon or alumina, as disclosed in Friefelder et al., *Journal of Organic Chemistry*, 31, 34–38 (1966); U.S. Pat. No. 2,675,390 to Roseneblatt, and U.S. Pat. No. 4,754,064 to Lillwitz. Cyclohexanedicarboxylic acids and chemical equivalents thereof may also be prepared by the use of an inert liquid medium using a catalyst of palladium or ruthenium in carbon or silica, wherein an acid is at least partially soluble under reaction conditions, as disclosed in U.S. Pat. No. 2,888,484 to Dekm et al. and U.S. Pat. No. 3,444,237 to Jaffe.

During hydrogenation, two or more isomers of cyclohexane dicarboxylic acids may be obtained, in which the carboxylic acid groups are in both the cis- and trans-positions. The cis- and trans-isomers can be separated by crystallization with or without a solvent, for example, n-heptane, or by distillation. Cis-isomers tend to provides better blending; however, trans-isomers tend to have higher melting and crystallization temperatures, either of which may be preferred depending on the end use. As such, mixtures of the cis- and trans-isomers of cyclohexanedicarboxylic acids are also useful herein. When a mixture of isomers and/or more than one diacid is used, a copolyester or a mixture of two polyesters may also be used as the cycloaliphatic polyester resin.

Chemical equivalents of these diacids include esters, alkyl esters, dialkyl esters, diaryl esters, anhydrides, acid chlorides, acid bromides, and the like. The preferred chemical equivalents comprise the dialkyl esters of the cycloaliphatic diacids. The most preferred chemical equivalent comprises dimethyl esters of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers are suitable as explained above and preferably in the ratios as explained above.

A preferred cycloaliphatic polyester is poly-1,4-cyclohexane-dimethanol-1,4-cyclohexanedicarboxylate (hereinafter referred to as PCCD), wherein $R^1$ and $R^2$ is a cyclohexylidene radical, and further wherein $R^2$ is derived from cyclohexanedicarboxylate or a chemical equivalent thereof, and is selected from the cis- or trans-isomer or a mixture of cis- and trans-isomers thereof.

Suitable cycloaliphatic polyester resins can be generally made as described in U.S. Pat. No. 2,465,319 to Whinfield et al. The reaction is generally conducted in the presence of a suitable catalyst such as, for example, tetra(2-ethyl hexyl) titanate, in a suitable amount, typically about 50 to 400 ppm of titanium based upon the final product.

The relative amounts of polyester, polycarbonate, and other optional polymers in the polymer system is generally dictated by the desired properties of the compositions and are readily determined by one of ordinary skill in the art without undue experimentation. For automotive parts, the polymer system generally comprises polyester resin in an upper amount of about 90, preferably about 70, and more preferably about 60 weight percent (wt %) of the total polymer system. The polyester resin is present in amounts greater than about 10, preferably greater than about 20 and more preferably greater than about 30 wt % of the total weight of the polymer system.

Polyester resins may also contain catalyst quenchers (also known as stabilizers) that inhibit activity of any catalysts that may be present in the resins. Catalyst quenchers are described in detail in U.S. Pat. No. 5,441,997 to Walsh et al. Preferably, quenchers provide a transparent and colorless product. Quenchers are used at a concentration of at least about 0.001%, preferably at least about 0.06% by weight of the polymer system and impact modifier. Quenchers are also used at a concentration of at most about 5%, preferably at most about 0.5% by weight of the polymer system and impact modifier.

Preferred quencher/stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof and the like. The suitability of a particular compound for use as a stabilizer may be readily determined without undue experimentation by one of skill in the art.

Useful acidic phosphate salts include sodium dihydrogen phosphate, mono zinc phosphate (MZP), potassium hydrogen phosphate, calcium dihydrogen phosphate and the like. The phosphites may have the formula $P(OR^3)(OR^4)(OR^5)$, wherein $R^3$, $R^4$ and $R^5$ are independently selected from the group consisting of hydrogen, alkyl and aryl with the proviso that at least one of $R^3$, $R^4$, and $R^5$ is hydrogen. The phosphate salts of a Group IB or Group IIB metal of the periodic table include zinc phosphate, copper phosphate, and the like. The phosphorus oxo acids include phosphorous acid, phosphoric acid, polyphosphoric acid or hypophosphorous acid. Suitable polyacid pyrophosphates are of the formula $M_xH_yP_nO_{3n+1}$, wherein M is a metal, x is from 1 to about 12, y is from 1 to about 12, n is from 2 to about 10, and the sum of x+y is equal to n+2. The preferred M is an alkaline or alkaline earth metal.

Preferred quenchers include oxo acids of phosphorous or acidic organo phosphorus compounds. Inorganic acidic phosphorus compounds may also be used as quenchers, with the most preferred quenchers being phosphoric or phosphorous acid.

Preferably, the composition comprises a polymer system that consists essentially of a blend of cycloaliphatic polyester as described above, and polycarbonate. By this is meant that additional polymers may be present, but preferably not any that would adversely impact the UV stability of the composition. Polycarbonates are discussed below.

Polycarbonates as used herein include homopolycarbonates, copolycarbonates and copolyestercarbonates and mixtures thereof, and includes compositions having structural units of formula (2):

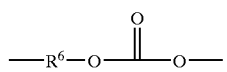

(2)

wherein $R^6$ represents aromatic organic radicals and/or aliphatic, alicyclic, or heteroaromatic radicals. Preferably, $R^6$ is an aromatic organic radical and, more preferably, a radical having the formula $-A^1-Y^1-A^2-$ wherein each of $A^1$ and $A^2$ is a monocyclic divalent aryl radical and $Y^1$ is a bridging radical having one or more atoms which separate $A^1$ from $A^2$. In an exemplary embodiment, one atom separates $A^1$ from $A^2$. Illustrative non-limiting examples of radicals of this type include: —O—, —S—, —S (O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, adamantylidene, and the like. The bridging radical $Y^1$ can be a hydrocarbon group, preferably a saturated hydrocarbon group such as, for example, methylene, cyclohexylidene or isopropylidene.

Suitable polycarbonates can be produced by the interfacial reaction of dihydroxy compounds in which only one atom separates $A^1$ and $A^2$. As used herein, the term "dihydroxy compound" includes, for example, bisphenol compounds having generally formula (3):

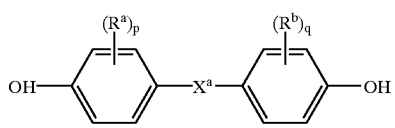

(3)

wherein $R^a$ and $R^b$ each represent a halogen atom or a monovalent hydrocarbon group and may be the same or different; p and q are each independently integers from 0 to 4; and $X^a$ represents one of the groups of formulas (4a) and (4b):

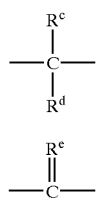

(4a)

(4b)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds represented by formulas 5a and 5b include: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis (4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; and bis(hydroxyaryl) cycloalkanes such as 1,1-bis(4-hydroxyphenyl) cyclohexane.

Two or more different dihydric phenols or a copolymer of a dihydric phenol with a glycol or with a hydroxy (—OH) or acid-terminated polyester may be employed, or with a dibasic acid or hydroxy acid, in the event a carbonate copolymer rather than a homopolymer may be desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

Suitable branching agents include polyfunctional organic compounds containing at least three functional groups, which may be hydroxyl, carboxyl, carboxylic anhydride, haloformyl and mixtures thereof. Examples include, but are not limited to trimellitic acid, trimellitic anhydride, trimellitic trichloride, tris-p-hydroxy phenyl ethane, isatin-bisphenol, 1,3,5-tris((p-hydroxyphenyl)isopropyl)benzene, 4(4 (1,1-bis(p-hydroxyphenyl)-ethyl, alpha,alpha-dimethyl benzyl)phenol, 4-chloroformyl phthalic anhydride, trimesic acid and benzophenone tetracarboxylic acid. Branching agents may be added at a level greater than about 0.005%. The branching agents may also be added at a level less than about 2.0% by weight of the polymer system and impact modifier. Branching agents and procedures for making branched polycarbonates are described in U.S. Pat. No. 3,635,895 to Kramer, and U.S. Pat. No. 4,001,184 to Scott.

Preferred polycarbonates are based on bisphenol A, in which each of $A^1$ and $A^2$ of formula 3 is p-phenylene and $Y^1$ is isopropylidene. The average molecular weight of the polycarbonate is greater than about 5,000, preferably greater than about 10,000, most preferably greater than about 15,000. In addition, the average molecular weight is less than about 100,000, preferably less than about 65,000, most preferably less than about 45,000 g/mol.

For automotive parts, the polymer system comprises polycarbonate resin in an upper amount of about 90 wt %, with an upper amount of about 70 wt % desired, and an upper amount of about 60 wt % more desired, each based on the total weight of the polymer system. A lower wt % of 10 can be employed, with a lower wt % of about 35 desired, and a lower wt % of about 40 more desired, again based on the total weight of the polymer system.

The polymer system may also include various additives incorporated in the resin blend. Such additives include, for example, dyes, pigments, special effect additives, lubricants, nucleating agents, flame retardants, fillers, reinforcing agents, heat stabilizers, antioxidants, plasticizers, antistatic agents, mold releasing agents, additional resins, blowing agents, and the like. Such additional additives being dependent on the final use of the composition, the use being readily determined by those of skill in the art without undue experimentation.

Examples of flame-retardants include halogenated aromatic flame-retardants (e.g., polybromophenyl ethers, brominated polyepoxide, brominated imides, brominated polycarbonate, poly(haloaryl acrylate), poly(haloaryl methacrylate), or mixtures thereof. Examples of such suitable flame retardants are brominated BPA epoxy resins, brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals. Other aromatic carbonate flame-retardants are set forth in U.S. Pat. No. 4,636,544 to Hepp. The flame-retardants may also be used with a synergist, particularly inorganic antimony compounds. Inorganic synergist compounds include $Sb_2O_5$, $SbS_3$, and the like. Especially preferred is antimony trioxide ($Sb_2O_3$).

Examples of fillers or reinforcing agents include glass flakes, glass fibers, asbestos, carbon fibers, silica, talc and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl) propionate, and pentaerythrityl-tetrakis[3-(3,5-di-tert-butyl-4-hydroxyphenyl) propionate]. Examples of plasticizers include dioctyl-4,5-epoxy-hexahydrophthalate, tris-(octoxycarbonylethyl) isocyanurate, tristearin and epoxidized soybean oil. Examples of antistatic agents include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Individual, as well as combinations of the foregoing may be used. Such additives may be incorporated at a suitable time, in a suitable manner, and at a suitable concentration during the formation of the composition.

When present, the composition may comprise various additives in an upper amount of about 40 wt %, with an upper amount of about 30 wt % desired, and an upper amount of about 5 wt % more desired, based on the total composition. When an essentially transparent composition is desired, the composition may comprise various additives having a total upper amount of about 15 wt %, with an upper amount of about 10 wt % desired, and an upper amount of about 5 wt % more desired. As used herein, essentially transparent is defined as a material having at least 70, preferably 80, and most preferably 90% transmission of visible light. The selection of particular additives and an effective concentration thereof depends on the final use of the composition, and is readily determined by one of skill in the art without undue experimentation.

The composition further comprises an impact modifier. Impact modifiers, as used herein, include materials effective to improve the impact properties of the composition, for example the ductility and/or the notched Izod impact strength of the composition. The present impact modified compositions preferably have a notched Izod impact strength of at least about 40 $kJ/m^2$ at $-20°$ C.

Useful impact modifiers are substantially amorphous copolymer resins, including but not limited to acrylic rubbers, ASA rubbers, diene rubbers, organosiloxane rubbers, EPDM rubbers, SBS or SEBS rubbers, ABS rubbers, MBS rubbers and glycidyl ester impact modifiers.

Acrylic rubbers are multi-stage, core-shell, interpolymer compositions having a cross-linked or partially cross linked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Particularly suitable are the so-called block copolymers and rubbery impact modifiers, for example, A—B—A triblock copolymers and A—B diblock copolymers. The A—B and A—B—A type block copolymer rubber additives which may be used as impact modifiers include thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful.

Suitable A—B and A—B—A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A—B and A—B—A block copolymers include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBR), polystyrene-poly(ethylene-propylene)-polystyrene, polystyrene-polyisoprene-polystyrene and poly($\alpha$-methylstyrene)-polybutadiene-poly($\alpha$-methylstyrene), as well as the selectively hydrogenated versions thereof, and the like. Mixtures comprising at least one of the aforementioned block copolymers are also useful. Such A—B and A—B—A block copolymers are available commercially from a number of sources, including Phillips Petroleum under the trademark SOLPRENE, Shell Chemical Co., under the trademark KRATON, Dexco under the trade name VECTOR, and Kuraray under the trademark SEPTON.

Other preferred rubbers useful herein as impact modifiers include graft and/or core shell structures having a rubbery component with a Tg (glass transition temperature) below $0°$ C., preferably between about $-40°$ to about $-80°$ C., which comprise poly-alkylacrylates or polyolefins grafted with poly(methyl)methacrylate or styrene-acrylonitrile copolymer. Preferably the rubber content is at least about 40 wt %, most preferably, at least about 60%, with between about 60–90 wt %.

Especially suitable rubbers for use as impact modifiers herein are the butadiene core-shell polymers of the type available from Rohm & Haas under the trade name PARALOID® EXL2600. Most preferably, the impact modifier will comprise a two stage polymer having a butadiene based rubbery core, and a second stage polymerized from methylmethacrylate alone or in combination with styrene. Impact modifiers of the type also include those that comprise acrylonitrile and styrene grafted onto cross-linked butadiene polymer, which are disclosed in U.S. Pat. No. 4,292,233 herein incorporated by reference.

Other impact modifiers useful herein include those which comprise polyphenylene ether, a polyamide or a combination of polyphenylene ether and a polyamide. The composition may also comprise a vinyl aromatic-vinyl cyanide copolymer. Suitable vinyl cyanide compounds include acrylonitrile and substituted vinyl cyanides such a methacrylonitrile. Preferably the impact modifier comprises styrene-acrylonitrile copolymer (hereinafter SAN). The preferred SAN composition comprises at least 10, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50 wt %) resin of this type (HRG-ABS) may be especially useful for impact modification of polyester resins and their polycarbonate blends.

Preferred impact modifiers, referred to as high rubber graft ABS modifiers, comprise greater than or equal to about 90 wt % SAN grafted onto polybutadiene, the remainder being free SAN. Preferred compositions include: about 8% acrylonitrile, 43% butadiene and 49% styrene, and about 7% acrylonitrile, 50% butadiene and 43% styrene, by weight. These materials are commercially available under the trade names BLENDEX 336 and BLENDEX 415 respectively (G.E. Plastics, Pittsfield, Mass.).

Other suitable impact modifiers may be mixtures comprising core shell impact modifiers made via emulsion polymerization using alkyl acrylate, styrene and butadiene. These include, for example, methymethacrylate-butadiene-styrene (MBS) and methymethacrylate-butylacrylate core shell rubbers.

A useful minimum concentration of impact modifier is about 3 weight percent (wt %), with about 5 wt % desired, and about 8 wt % more desired, based on the total weight5 of the polymer system and the impact modifier. An upper concentration of of about 50 wt % can be employed, with about 15 wt % desired, and about 10 wt % more desired, wherein the weight percentages are based on the total weight of the polymer system and the impact modifier.

The UV stabilized composition further includes an additive composition that comprises a combination of a hindered amine light stabilizer and another UV absorber. Useful hindered amine light stabilizers (hereinafter HALS) include substituted piperidine moieties and oligomers thereof, as disclosed in U.S. Pat. No. 4,895,901 to Ramey et al., U.S. Pat. No. 4,210,612 to Karrer, and U.S. Pat. No. 5,015,682 to Galbo. The preferred HALS include 4-piperidinol derivatives having the general formula (5):

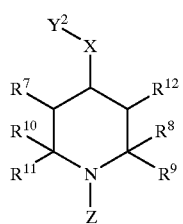

(5)

wherein

X is oxygen, and $Y^2$ is preferably hydrogen, or hydroxyalkyl, aminoalkyl, or alkyl substituted by both hydroxyl and amino groups, where the alkyl has up to about 20 carbon atoms on average, but may also represent a moiety compatible with the light stabilizing properties of the remainder of the molecule and that furnishes the requisite reactive group.

$R^7$ and $R^{12}$ are each independently selected from the group consisting of a hydrogen atom, an alkyl group, an alkenyl group, or an arylalkyl group. Preferably, $R^7$ and $R^{12}$ are each hydrogen. $R^8$, $R^9$, $R^{10}$, and $R^{11}$ are each independently selected from the group consisting of an alkyl group having 1 to about 6 carbon atoms, phenyl, an arylalkyl group, an aromatic heterocyclic group having 5 or 6 carbon atoms, and containing an oxygen, sulphur, hydrogen, or nitrogen atom, or $R^8$, $R^9$, $R^{10}$, and $R^{11}$ respectively, together or with the carbon atom to which they are attached may represent a C to C cycloalkyl group. Preferably, $R^8$, $R^9$, $R^{10}$, and $R^{11}$ are methyl.

Z represents hydrogen, an acyl group, an oxy radical, an alkyl group, an alkenyl group, an alkoxyalkyl group, an arylalkyl group that is unsubstituted or which has one or more substituents in its aryl moiety, including, for example, 2,3-epoxypropyl. Z is preferably represented by the formula —$CH_2COOR^{13}$, wherein $R^{13}$ represents an alkyl group, an alkenyl group, a phenyl group, an arylalkyl group or a cyclohexyl group. Most preferably, Z is represented by the formula —$CH_2CH(R^{14})OR^{15}$, wherein $R^{14}$ represents a hydrogen atom, a methyl group or a phenyl group and $R^{15}$ represents a hydrogen atom, an alkyl group, an ester, a carbonyl, an acyl group, an aliphatic acyl group, or a group represented by the formula —$COOR^{16}$, or —$OOCR^{16}$, wherein $R^{16}$ represents an alkyl group, a benzyl group, a phenyl group, and the like.

One preferred oligomeric HALS is represented by formula (6):

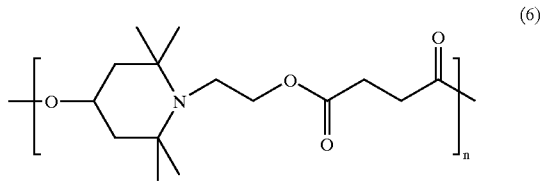

(6)

wherein n is on average greater than about 9, and less than about 12 (i.e., having a molecular weight from about 3100 to about 4000). This material is commercially available under the trade name TINUVIN 622 (CAS Number 065447-77-0, Ciba Specialty Chemicals, Inc., Basel Switzerland).

Another preferred oligomeric HALS is represented by the general formula (7):

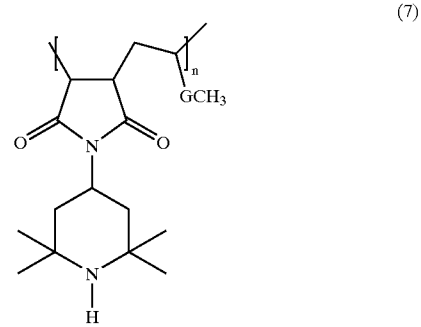

(7)

wherein G is a $C_{17}$–$C_{21}$ alkyl group and n is on average greater than about 4 and less than about 7 (i.e., having a molecular weight from about 3000 to about 4000). One example of this type of HALS wherein n is on average greater than about 4 and less than about 7 is commercially available under the trade name UVINUL 5050H from BASF.

Another preferred HALS is represented by formula (8):

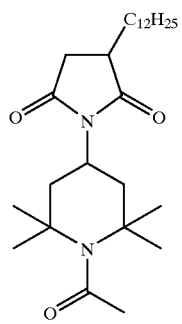

(8)

This HALS is commercially available under the trade name SANDUVOR 3058 from Clariant.

The HALS is present in the composition at a concentration greater than about 0.01%, preferably greater than about 0.05%, most preferably greater than about 0.08% by weight based on the total weight of the composition. The HALS is also present in the composition at a concentration less than about 10%, preferably less than about 1%, most preferably less than about 0.6% by weight based on the total weight of the composition.

In addition to the HALS, the UV additive composition also comprises another UV absorber that is different from the particular HALS selected above. This second UV absorber includes, for example, a second HALS, a benzotriazole UV absorbers, and/or a hydroxyphenyl-triazine or -pyrimidine UV absorber. Suitable benzotriazole UV absorbers include the compound represented by formula (9):

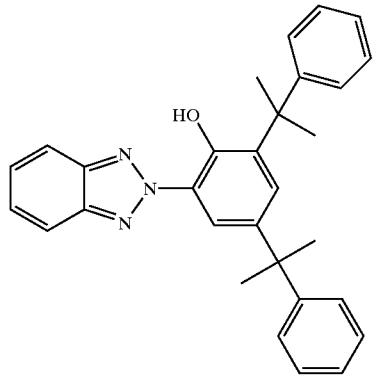

(9)

This benzotriazole UV absorber is commercially available under the trade name Tinuvin 234 from Ciba.

Another preferred benzotriazole UV absorber is represented by the formula (10):

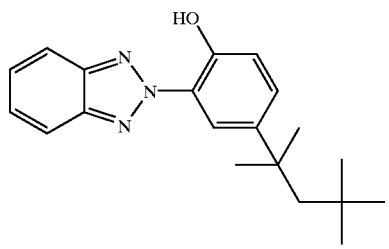

(10)

This benzotriazole UV absorber is commercially available under the trade name Cyasorb UV-5411 from Cytec.

Suitable hydroxyphenyl-triazine or pyrimidine UV absorbers include compounds having a 2,4,6-trisaryl-1,3,5-triazine or 2,4,6-trisaryl-1,3-pyrimidine group, and which further contain free hydroxyl groups. Such compounds are described, for example, in U.S. Pat. No. 3,118,887 to Johns et al., U.S. Pat. No. 3,244,708 to Duennenberger et al., U.S. Pat. No. 3,423,360 to Huber et al., WO 86/3528, U.S. Pat. No. 4,831,068 to Reinert et al., EP-A-434 608, EP-A-458 741, EP-A-483 488, U.S. Pat. No. 5,298,067 to Valet, U.S. Pat. No. 3,442,898 to Luethi et al., and U.S. Pat. No. 4,895,981 to Reinert et al.

The preferred hydroxyphenyl pyrimidine and triazine UV absorbers comprise a pyrimidines or triazines having two phenyl groups, and a resorcinol or substituted resorcinol group attached to the triazine or pyrimidine ring, as disclosed in U.S. Pat. No. 6,239,276 B1 to Gupta et al. and U.S. Pat. No. 5,597,854 to Birbaum et al. Suitable hydroxyphenyl-triazine UV absorbers are generally represented by formula (11):

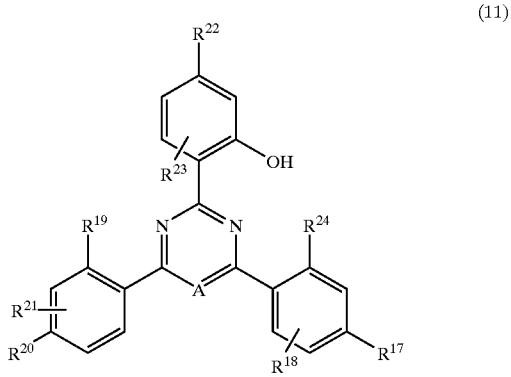

(11)

wherein A is N or CH; and, $R^{17}$, $R^{18}$, $R^{19}$, $R^{20}$, $R^{21}$, $R^{22}$, $R^{23}$, and $R^{24}$ are each independently selected from the group consisting of hydrogen, alkyl, cycloalkyl, halogen, haloalkyl, alkoxy, alkylene, aryl, alkyl-aryl, or a combination thereof. Preferably, the hydroxyphenyl-triazine UV absorber is represented by formula (12):

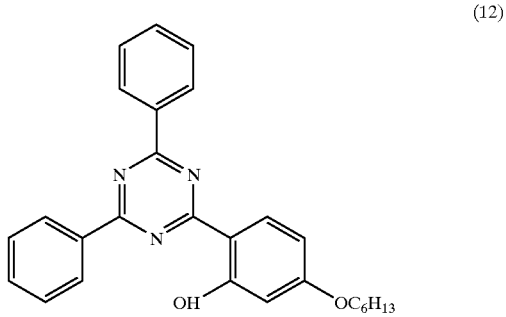

(12)

This material is commercially available under the trade name TINUVIN 1577 (CAS Number 147315-50-2, Ciba Specialty Chemicals, Inc., Basel Switzerland). Another example of a preferred hydroxyphenyl-triazine UV absorber is represented by formula (13):

(13)

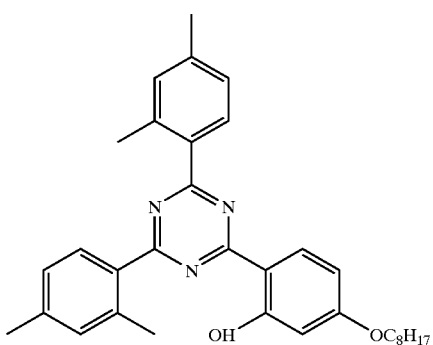

This material is commercially available under the trade name CYASORB UV-1164, from Cytec Industries.

The additional UV absorbers as discussed above are present in the composition at a concentration greater than about 0.01%, preferably greater than about 0.1%, most preferably greater than about 0.2% by weight, based on the total weight of the composition. The additional UV absorbers are furthermore present in the composition at a concentration less than about 10%, preferably less than about 3%, most preferably less than about 0.5% by weight, based on the total weight of the composition.

The composition may be formed by techniques known in the art. The ingredients are typically in powder or granular form, and extruded as a blend, and/or comminuting into pellets or other suitable shapes. The ingredients may be combined in any manner, e.g., by dry mixing or by mixing in the melted state in an extruder, or in other mixers. For example, one embodiment comprises melt blending the ingredients in powder or granular form, extruding the blend and comminuting into pellets or other suitable shapes. Also included is dry mixing the ingredients, followed by mixing in the melted state in an extruder.

The method of processing the present compositions into films can be carried out by conventional film extrusion techniques, for example, by melting the different materials of the different layers in separate extruders and conveying those materials to a die where these different materials are combined into a film. Also included are blow molding and injection molding of the composition. The compositions disclosed herein are thus produced in a manner readily determined by one of skill in the art without undue experimentation.

The compositions described herein unexpectedly provide an enhanced UV stability. The above-described compositions accordingly have a change color (expressed in dE) of less than about 3, preferably less than about 2, and most preferably less than about 1.7 after 810 hours of indoor weathering according to Protocol PV1303.

These UV stabilized compositions described herein are suitable for a wide variety of uses, for example in interior automotive applications including: components, decorative parts or trim pieces of dashboards, elements of sun visors or rear view mirrors, decorative or structural parts of auto interior components; in decorative, structural parts or trim pieces of recreational vehicles including golf carts, boats, jet skies, bicycles, body panels, cladding, and mirror housings; and in applications for building & construction, including, for example, outdoor signs, ornaments, and exterior siding for buildings.

The disclosure is further illustrated by the following non-limiting examples.

EXAMPLES

Protocol PV1303 is an artificial weathering test procedure similar to DIN 75 202 (1991). The equipment used herein was an Atlas Ci3000 Weather-O-meter, using the conditions: black panel temperature 100±3° C., test sample chamber temperature: 65±3° C., relative humidity in test chamber: 20±10%, light intensity (420 nm): 1.2 watts per square meter (W/m2), Filter system: Borosilicate/Soda lime. The test length is expressed in "cycles", with one cycle representing about 280 to 340 kJ/m2, roughly about 70 to 80 hrs.

Accelerated weathering evaluation of transparent materials is generally followed by color, transmission, and haze measurements. Gloss values were measured using ASTM D523 at a measurement angle of 60 degrees. The color test measures color of the weathered sample using a Cielab System, expressed in L, a, and b values. The color change dE is calculated from the L, a, and b values measured before and after the weathering test. Transmission and haze were measured using ASTM D1003, and are an indication of the amount of light that is able to pass through the sample, and a measure of the amount of light that is blocked from passing through the sample, respectively. Yellowness Index (YI) is measured according to ASTM D1925.

The Notched Izod test (NI) is conducted at −20 C., and is based on the ISO 180 method. The NI test samples are cooled to −20° C. prior to testing in a conventional cooling device. The result of the test is reported in terms of energy absorbed per unit of specimen width, and expressed in kilo joules per square meter ($kJ/m^2$). Typically the final test result is calculated as the average of test results of five test samples. Acceptable levels of an impact modified composition depend on the final use of the composition, however, as stated above, an impact modified composition has an NI at −20° C. of at least about 40, preferably at least about 50, most preferably at least about 60 $kj/m^2$.

Melt flow (MVR) is evaluated using a test procedure based on the ISO 1133 method. The equipment used is an extrusion plast-o-meter equipped with an automatic timer. Typical examples of this equipment include the Zwick 4105 and the G ö ttfert MP-E. Before testing, the samples are dried for three to five hours at 75° C. The testing conditions are a melt temperature of 250° C., a total load of 5.000 grams, and a dwell time of 4 minutes. The test result is expressed in the unit cubic centimeter per 10 minutes (cc/10 minutes).

In the following examples, the compositions were formed in a Werner & Pfleiderer WP-25 twin-screw compounder, the melt temperature was about 265° C. Test samples were prepared using an Engel ES500/110 HLV injection-molding machine equipped with a 40 mm screw. Prior to injection molding, the materials were dried for 3 to 5 hrs at about 75° C. The melt temperature was kept at around 265° C., the mold temperature was about 60° C.

Formulations and results for examples 1–38 are shown in Table 1–3 below. Examples 26, 28, 30, 32, 33, and 37 are in accordance with the present invention. In the Tables:

PC105 is a linear polycarbonate having a molecular weight (Mw) of about 30,000 to 31,000 g/mol;

PC175 is a linear polycarbonate having a molecular weight of about 21,000 to 23,000 g/mol;

MZP is mono zinc phosphate;

Irganox 1010 is penta-erythritol-tetrakis (3-(3,5-di-tert.butyl-4-hydroxy-phenyl-) propionate), from Ciba;

Irgaphos 168—tris(2,4-di-tert.butylphenyl)phosphite from Ciba; and

P-EPQ is SANSOSTAB P-EPQ is tetrakis (2,4-di-tert.butyl phenyl-4,4'-biphenylylene-diphosphonite from Clariant.

TABLE 1

| Formulation | Sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| PCCD | 29.9 | 49.2 | 40.0 | 59.7 | 39.8 | 49.8 | 39.9 | 39.7 | 46.6 | 46.5 | 39.9 | 39.9 | 39.7 |
| PC105 | | | 24.4 | 26.5 | 39.8 | 24.9 | 24.4 | 24.3 | 21.5 | 14.3 | 24.4 | 24.4 | 24.3 |
| PC175 | 69.7 | 45.4 | 24.4 | 13.3 | 19.9 | 24.9 | 24.4 | 24.3 | 21.5 | 28.7 | 24.4 | 24.4 | 24.3 |
| Blendex 336 | | | 10.0 | | | | 10.0 | 10.0 | | | 10.0 | 10.0 | 10.0 |
| Blendex 415 | | 0.5 | | | | | | | 10.0 | 10.0 | | | |
| MZP | 0.1 | 0.1 | 0.2 | 0.1 | 0.1 | 0.1 | 0.2 | 0.2 | 0.1 | 0.1 | 0.2 | 0.2 | 0.2 |
| Irganox 1010 | | | 0.2 | | | | 0.2 | 0.2 | | | 0.2 | 0.2 | 0.2 |
| PEPQ[6] | 0.3 | 0.3 | 0.4 | 0.3 | 0.3 | 0.3 | 0.4 | 0.4 | 0.3 | 0.3 | 0.4 | 0.4 | 0.4 |
| Irgafos 168 | | | 0.4 | | | | 0.4 | 0.4 | | | 0.4 | 0.4 | 0.4 |
| Tinuvin 234 | | | | | | | | | | | | | |
| Cyasorb UV-5411 | | | | | | | 0.1 | 0.5 | | | | | |
| Tinuvin 1577 | | | | 0.1 | 0.1 | | | | 0.1 | 0.1 | 0.1 | 0.1 | 0.5 |
| Cyasorb UV-1164 | | | | | | | | | | | 0.0 | | |
| Uvinul 5050H | | | | | | 0.1 | | | | | | | |
| Tinuvin 622LD | | | | | | | | | | | | | |
| Sandostab 3058 | | | | | | | | | | | | | |
| MVR(250° C./5 kg) | | | 12.2 | | | 18.8 | 11.8 | 12.0 | 13.0 | | 11.9 | 11.5 | 12.1 |
| Color YI | 1.1 | 2.3 | 10.9 | 2.8 | 1.7 | 2.3 | 12.2 | 12.9 | 5.8 | 4.1 | 11.6 | 11.6 | 12.9 |
| L | 95.4 | 94.4 | 92.3 | 95.7 | 95.9 | 94.0 | 91.9 | 91.0 | 94.4 | 94.1 | 91.3 | 92.4 | 91.8 |
| A | 0.0 | 0.0 | 0.4 | −0.1 | −0.1 | 0.4 | 0.3 | 0.1 | −0.3 | −0.2 | 0.4 | 0.4 | 0.3 |
| B | 0.4 | 1.3 | 5.9 | 1.4 | 0.8 | 2.1 | 6.5 | 7.4 | 3.2 | 2.4 | 7.1 | 6.2 | 6.7 |
| Transmission | 89.8 | 87.6 | 79.7 | 90.3 | 91.1 | 86.8 | 78.5 | 77.6 | 87.3 | 86.7 | 79.0 | 80.3 | 79.0 |
| Haze | 3.1 | 5.1 | 13.6 | 3.5 | 2.4 | 6.0 | 15.0 | 16.2 | 6.6 | 7.0 | 14.1 | 11.6 | 13.8 |
| Gloss 60° | 140 | 126 | 131 | 133 | 136 | 130 | 132 | 129 | 123 | 121 | 129 | 133 | 133 |
| Izod-20° C. kJ/m² | 2 | | 52.9 | 8 | 13 | | 50.5 | 51.4 | | 47 | 51.5 | 58.1 | 52.7 |
| DE | 12.6 | 12.3 | | 3.0 | 5.0 | 3.4 | | | 8.5 | 7.1 | | | |
| delta transmission | −6.0 | −5.0 | | −1.6 | −2.5 | 1.0 | | | −4.3 | −2.4 | | | |
| delta haze | 1.2 | 0.4 | | 0.0 | −0.3 | 0.5 | | | 1.5 | −0.4 | | | |

TABLE 2

| Formulation | Sample No. | | | | | | | | | | | | | |
|---|---|---|---|---|---|---|---|---|---|---|---|---|---|---|
| | 14 | 15 | 16 | 17 | 18 | 19 | 20 | 21 | 22 | 23 | 24 | 25 | 26 | 27 |
| PCCD | 39.9 | 40.3 | 43.9 | 46.6 | 39.9 | 39.7 | 46.6 | 46.6 | 39.9 | 39.7 | 46.4 | 46.4 | 46.4 | 46.4 |
| PC105 | 24.4 | 24.6 | 22.8 | 21.5 | 24.4 | 24.3 | 21.5 | 21.5 | 24.4 | 24.3 | 21.4 | 21.4 | 21.4 | 21.4 |
| PC175 | 24.4 | 24.6 | 22.8 | 21.5 | 24.4 | 24.3 | 21.5 | 21.5 | 24.4 | 24.3 | 21.4 | 21.4 | 21.4 | 21.4 |
| Blendex 336 | 10.0 | 10.0 | 10.0 | | 10.0 | 10.0 | | | 10.0 | 10.0 | | | | |
| Blendex 415 | | | | 10.0 | | | 10.0 | 10.0 | | | 10.0 | 10.0 | 10.0 | 10.0 |
| MZP | 0.2 | 0.1 | 0.1 | 0.1 | 0.2 | 0.2 | 0.1 | 0.1 | 0.2 | 0.2 | 0.1 | 0.1 | 0.1 | 0.1 |
| Irganox 1010 | 0.2 | | | | 0.2 | 0.2 | | | 0.2 | 0.2 | | | | |
| PEPQ | 0.4 | 0.3 | 0.3 | 0.3 | 0.4 | 0.4 | 0.3 | 0.3 | 0.4 | 0.4 | 0.3 | 0.3 | 0.3 | 0.3 |
| Irgafos 168 | 0.4 | | | | 0.4 | 0.4 | | | 0.4 | 0.4 | | | | |
| Tinuvin 234 | | | | | | | | | | | | | | |
| Cyasorb UV-5411 | | | | | | | | | | | | | | |
| Tinuvin 1577 | | | | | | | | | | | 0.1 | 0.0 | 0.1 | 0.1 |
| Cyasorb UV-1164 | | | | | | | | | | | 0.3 | 0.3 | | |
| Uvinul 5050H | 0.1 | 0.1 | 0.1 | 0.1 | 0.1 | 0.5 | | | | | | 0.1 | | |
| Tinuvin 622LD | | | | | | | 0.1 | | | | | | 0.3 | |
| Sandostab 3058 | | | | | | | | | 0.1 | | | | | 0.3 |
| MVR(250° C./5 kg) | 11.0 | 11.1 | 17.3 | 12.1 | 11.9 | 12.0 | 12.3 | 11.6 | 11.7 | 12.0 | 10.9 | 11.1 | 11.7 | 12.5 |
| Color YI | 8.9 | 9.6 | 3.8 | 6.9 | 13.6 | 12.7 | 5.2 | 5.1 | 11.7 | 11.6 | 8.3 | 8.3 | 7.8 | 6.0 |
| L | 90.8 | 90.4 | 94.6 | 93.8 | 92.2 | 92.2 | 94.5 | 94.7 | 91.9 | 90.9 | 94.3 | 94.1 | 93.3 | 94.2 |
| A | −0.1 | 0.0 | −0.1 | −0.3 | 0.3 | −0.2 | −0.2 | −0.3 | 0.3 | 0.0 | −1.2 | −1.1 | −0.2 | −0.3 |
| B | 5.2 | 5.3 | 2.0 | 3.8 | 6.2 | 7.2 | 2.8 | 2.8 | 6.5 | 7.4 | 5.6 | 5.5 | 4.4 | 3.4 |
| Haze | 19.4 | 20.6 | 4.5 | 7.9 | 15.7 | 14.1 | 6.3 | 5.7 | 14.2 | 13.5 | 6.6 | 7.4 | 11.4 | 8.2 |
| Transmission | 79.9 | 78.6 | 87.9 | 86.1 | 77.3 | 79.3 | 87.5 | 88.0 | 79.3 | 79.6 | 87.1 | 86.7 | 84.5 | 86.8 |
| Gloss 60° | 112 | 114 | 135 | 122 | 132 | 132 | 125 | 125 | 132 | 130 | 122 | 122 | 116 | 116 |
| Izod-20° C. kJ/m² | | | | | 55.1 | 54.5 | | | 54.1 | 53.7 | | | | |
| DE | 9.7 | 7.6 | 9.3 | 11.1 | | | 9.2 | 11.5 | | | 3.9 | 5.5 | 1.7 | 3.8 |
| delta transmission | 2.8 | −1.0 | −4.9 | −5.8 | | | −2.2 | −3.7 | | | −2.4 | −3.2 | −1.2 | −1.8 |
| delta haze | −0.7 | −3.4 | 1.1 | 3.2 | | | −0.9 | −0.4 | | | 1.4 | 0.6 | 1.9 | 0.2 |

TABLE 3

| Formulation | 28 | 29 | 30 | 31 | 32 | 33 | 34 | 35 | 36 | 37 | 38 |
|---|---|---|---|---|---|---|---|---|---|---|---|
| PCCD | 46.4 | 46.4 | 46.4 | 46.4 | 46.4 | 49.0 | 46.4 | 46.4 | 46.4 | 46.4 | 46.4 |
| PC105 | 21.4 | 21.4 | 21.4 | 21.4 | 21.4 | 22.6 | 21.4 | 21.4 | 21.4 | 21.4 | 21.4 |
| PC175 | 21.4 | 21.4 | 21.4 | 21.4 | 21.4 | 22.6 | 21.4 | 21.4 | 21.4 | 21.4 | 21.4 |
| Blendex 336 | | | | | | | | | | | |
| Blendex 415 | 10.0 | 10.0 | 10.0 | 10.0 | 10.0 | 5.0 | 10.0 | 10.0 | 10.0 | 10.0 | 10.0 |
| MZP | 0.1 | 0.1 | 0.1 | 0.1 | 0.1 | 0.1 | 0.1 | 0.1 | 0.1 | 0.1 | 0.1 |
| Irganox 1010 | | | | | | | | | | | |
| PEPQ | 0.3 | 0.3 | 0.3 | 0.3 | 0.3 | 0.3 | 0.3 | 0.3 | 0.3 | 0.3 | 0.3 |
| Irgafos 168 | | | | | | | | | | | |
| Tinuvin 234 | | | | | | | | | | | |
| Cyasorb UV-5411 | | | | | | | | | | | |
| Tinuvin 1577 | | | | | | | | | | | |
| Cyasorb UV-1164 | 0.1 | 0.1 | 0.2 | 0.2 | 0.3 | 0.3 | 0.3 | 0.1 | 0.3 | | |
| Uvinul 5050H | | | | | | | | | | 0.1 | 0.1 |
| Tinuvin 622LD | 0.3 | | 0.2 | | 0.1 | 0.1 | | | | 0.3 | |
| Sandostab 3058 | | 0.3 | | 0.2 | | | 0.1 | | | | 0.3 |
| MVR (250° C./5 kg) | 12.6 | 12.6 | 12.4 | 12.4 | 10.5 | | 10.7 | 12.3 | 12.6 | 12.2 | 12.7 |
| Color YI | 8.5 | 6.1 | 7.8 | 6.7 | 7.3 | 53.2 | 8.1 | 6.0 | 7.0 | 7.6 | 5.3 |
| L | 93.2 | 94.5 | 93.5 | 94.2 | 94.6 | 93.3 | 94.1 | 94.8 | 94.5 | 93.3 | 94.0 |
| A | −0.5 | −0.5 | −0.6 | −0.7 | −1.1 | −5.3 | −1.2 | −0.6 | −1.0 | −0.3 | −0.4 |
| B | 5.0 | 3.8 | 4.9 | 4.3 | 4.9 | 35.7 | 5.5 | 3.7 | 4.8 | 4.3 | 3.1 |
| Haze | 15.1 | 7.0 | 9.4 | 8.5 | 6.2 | 91.3 | 8.0 | 6.6 | 6.4 | 11.1 | 6.5 |
| Transmission | 83.5 | 87.5 | 85.2 | 86.5 | 87.8 | 80.3 | 87.1 | 87.8 | 87.5 | 84.5 | 88.2 |
| Gloss 60° | 107 | 120 | 112 | 116 | 120 | | 120 | 117 | 119 | 115 | 118 |
| Izod-20° C. kJ/m² | | | | | | | | | | | |
| DE | 1.6 | 3.5 | 1.4 | 2.7 | 1.6 | 1.1 | 3.3 | 3.6 | 3.5 | 1.4 | 3.4 |
| delta transmission | −1.1 | −1.5 | −1.2 | −1.3 | −0.6 | 0.0 | −2.5 | −1.8 | −1.8 | −0.9 | −1.5 |
| delta haze | 2.4 | 1.0 | 2.7 | 0.1 | 1.2 | −0.9 | 1.2 | 1.0 | 0.7 | 2.2 | 0.1 |

The data in Tables 1–3 clearly show that non-impact modified PCCD/PC blends (i.e., blends having an Izod −20° C. value of <20 kJ/m²) can be UV stabilized through the addition of a UV stabilizer such as Cyasorb UV-5411 or Cyasorb UV-1164 (examples 1, 4, 5, 6). Addition of 0.1% of one of these additives reduces the dE upon 810 hours exposure from a value above 12.6 to a value close to or below 5. However, upon introduction of an impact modifier (i.e., Blendex 336 or Blendex 415), merely adding one UV stabilizer does not lead to a dE close to a more suitable level defined herein as a dE equal to or below 2, as can be seen from examples 7 through 23, all of which have an Izod −20° C. value of greater than 45 kJ/m². In this series, a variety of UV stabilizers were screened at levels consistent with knowledge available in the art (i.e., about 0.1 to 0.5 wt. %). When used alone, neither the type of UV stabilizer, nor the level appears to have a significant effect on UV stabilization.

Surprisingly, combining a HALS with another UV stabilizer, including another HALs, has an unexpected synergistic effect on the UV performance. All of the dE values obtained after 810 hrs of UV exposure of examples 24 through 38 are below 5, with a number of them below 2.

More surprisingly, it was discovered that combination of an HALS, and in particular Uvinul 505H as one of the components in the additive composition, leads to a more acceptable UV stability of the composition, wherein the dE is less than or equal to 2. This unexpected result represented by examples 26, 28, 30, 32, 33, and 37.

Accordingly, the compositions disclosed herein provide for an impact modified PCCD/PC/ABS blend that is UV stabilized, in that it does not appreciably discolor upon exposure to UV light, defined herein as a dE less than or equal to 2.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An essentially transparent UV stabilized composition, comprising:

a polymer system, wherein said polymer system consists essentially of a cycloaliphatic polyester resin and a linear polycarbonate resin;

a rubber grafted ABS impact modifier, comprising greater than or equal to about 90 wt % styrene-acrylonitirle copolymer (SAN) grafted onto polybutadiene, the remainder being free SAN; and an additive composition, comprising a hindered amine light stabilizer represented by the formula:

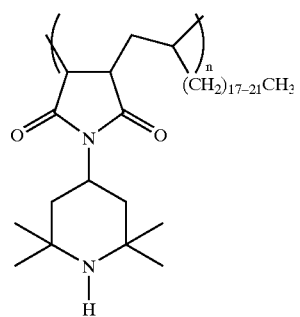

wherein n is on average greater than about 4, and less than about 7; and a UV absorber selected from the group consisting of: another hindered amine light stabilizer, a hydroxyphenyl-triazene, a hydroxyphenyl-pyrimidine, a benzotriazole, or a combination comprising at least one of the foregoing.

2. The composition of claim 1, having a % transmission of visible light greater than or equal to about 70% according to ASTM D1003.

3. The compositions of claim 1, having a change color change of less than about 5 after 810 hours of indoor weathering according to Protocol PV1303, wherein the color change is calculated from the L, a, and b values measured before and after said indoor weathering.

4. The composition of claim 1, having a notched Izod impact strength at −20° C. of more than about 40 kJ/m$^2$.

5. An article comprising the composition of claim 1.

6. A method for the manufacture of an article or film, comprising casting or molding the composition of claim 1.

* * * * *